(12) United States Patent
Hurst et al.

(10) Patent No.: US 12,391,003 B2
(45) Date of Patent: Aug. 19, 2025

(54) SYSTEMS AND METHODS FOR THREE-DIMENSIONAL PRINTING AND PRODUCTS PRODUCED THEREBY

(71) Applicant: Lung Biotechnology PBC, Silver Spring, MD (US)

(72) Inventors: Greg Hurst, Bedford, NH (US); Masoud Modaresifar, Manchester, NH (US); Mohammadali Safavieh, Nashua, NH (US); Derek Morris, Bedford, NH (US); Luis Alvarez, Lexington, MA (US); Daniel Backman, Bedford, NH (US)

(73) Assignee: Lung Biotechnology PBC, Silver Spring, MD (US)

( * ) Notice: Subject to any disclaimer, the term of this patent is extended or adjusted under 35 U.S.C. 154(b) by 580 days.

(21) Appl. No.: 17/686,123

(22) Filed: Mar. 3, 2022

(65) Prior Publication Data
US 2022/0281178 A1    Sep. 8, 2022

Related U.S. Application Data

(60) Provisional application No. 63/156,555, filed on Mar. 4, 2021.

(51) Int. Cl.
*B29C 64/393* (2017.01)
*B33Y 50/02* (2015.01)
*G06T 17/00* (2006.01)
*B33Y 70/10* (2020.01)

(52) U.S. Cl.
CPC ............ *B29C 64/393* (2017.08); *B33Y 50/02* (2014.12); *G06T 17/00* (2013.01); *B33Y 70/10* (2020.01)

(58) Field of Classification Search
CPC ..... B29C 64/386; B29C 64/393; B33Y 50/00; B33Y 50/02; B33Y 70/10; B33Y 10/00; B33Y 80/00; B33Y 70/00; G06T 17/00; G06T 19/00
See application file for complete search history.

(56) References Cited

U.S. PATENT DOCUMENTS

| 4,575,330 A | 3/1986 | Hull |
| 6,366,825 B1 | 4/2002 | Smalley et al. |
| 2004/0012799 A1* | 1/2004 | Gallagher ............ H04N 1/407 358/1.9 |
| 2013/0313756 A1* | 11/2013 | Chen ..................... B29C 41/52 425/150 |
| 2017/0102679 A1 | 4/2017 | Greene et al. |

(Continued)

FOREIGN PATENT DOCUMENTS

EP    3 164 259 A1    5/2017

*Primary Examiner* — Kidest Bahta
(74) *Attorney, Agent, or Firm* — Foley & Lardner LLP (57) ABSTRACT

An additive manufacturing device includes an output device and a controller. The output device is configured to receive at least one material to generate a component. The controller includes one or more processors configured to receive a model including a plurality of pixels representing the component, identify at least one pixel of the plurality of pixels corresponding to a first surface of the component, modify the model to adjust an exposure corresponding to the at least one pixel based on a target exposure, and control operation of the output device to cause the output device to generate the component based on the modified model.

20 Claims, 9 Drawing Sheets

(56) References Cited

U.S. PATENT DOCUMENTS

| | | | |
|---|---|---|---|
| 2017/0182708 A1* | 6/2017 | Lin | B29C 64/35 |
| 2017/0190110 A1* | 7/2017 | Fortunato | B29C 64/386 |
| 2017/0283766 A1 | 10/2017 | Hribar et al. | |
| 2018/0086003 A1* | 3/2018 | Greene | B33Y 50/02 |
| 2019/0152153 A1 | 5/2019 | Budel et al. | |
| 2019/0308371 A1* | 10/2019 | Knecht | B33Y 40/20 |

* cited by examiner

SYSTEMS AND METHODS FOR THREE-DIMENSIONAL PRINTING AND PRODUCTS PRODUCED THEREBY

CROSS-REFERENCE TO RELATED APPLICATIONS

The present application claims priority to U.S. Provisional Application No. 63/156,555, filed Mar. 4, 2021.

BACKGROUND

The present application relates generally to the field of component manufacturing, and more particularly to systems and methods for three-dimensional (3D) printing and products produced thereby.

3D printing can be used to generate a variety of components based on computer models of the components.

SUMMARY

At least one aspect relates to an additive manufacturing device. The additive manufacturing device can include an output device and a controller. The output device can be configured to receive at least one material to generate a component. The controller can include one or more processors configured to receive a model including a plurality of pixels representing the component, identify at least one pixel of the plurality of pixels corresponding to a first surface of the component, modify the model to adjust an exposure corresponding to the at least one pixel based on a target exposure, and control operation of the output device to cause the output device to generate the component based on the modified model.

At least one aspect relates to a system. The system can include one or more processors configured to receive a model that includes a plurality of pixels representing a component, identify at least one pixel of the plurality of pixels corresponding to a first surface of the component, modify the model to adjust an exposure corresponding to the at least one pixel based on a target exposure, and control operation of an output device to generate the component based on the modified mode.

At least one aspect relates to a method. The method can include receiving, by one or more processors, a model that includes a plurality of pixels representing a component, identifying, by the one or more processors, at least one pixel of the plurality of pixels corresponding to a first surface of the component, modifying, by the one or more processors, the model to adjust an exposure corresponding to the at least one pixel based on a target exposure; and controlling, by the one or more processors, an output device to generate the component based on the modified model.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Additive manufacturing processes, such as three-dimensional (3D) printing, can be used to generate various components (e.g. parts). For example, 3D printing can be used to produce components for artificial organs, such as tissue or scaffolds of lungs or other organs, including but not limited to autologous tissue components. The printed components can be used as a scaffold for biological materials, such as various cell types.

Figure 1:
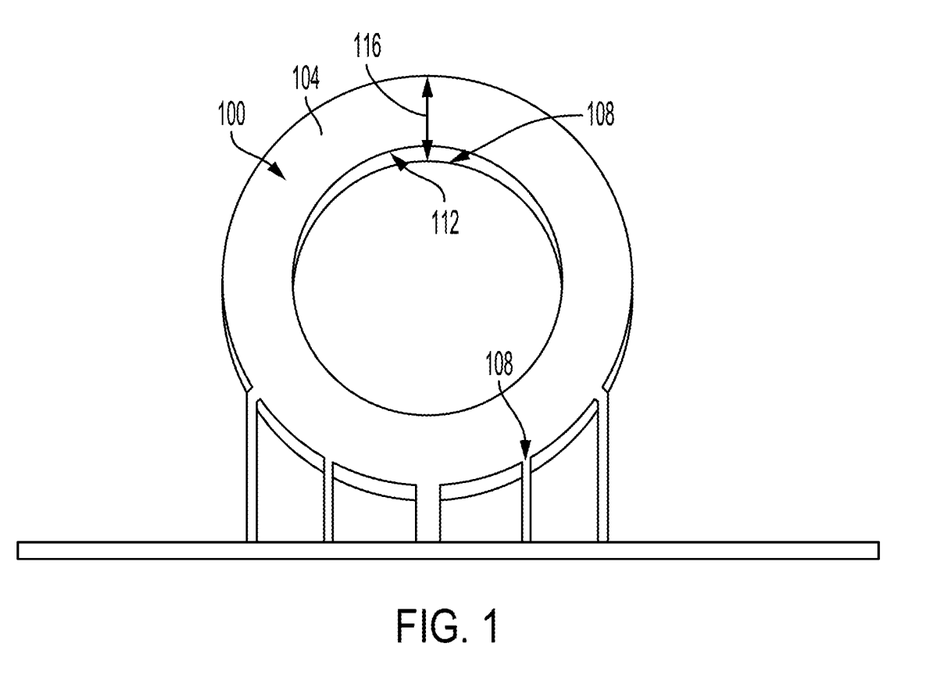
FIG. 1 illustrates an example component generated using a 3D printer, according to an embodiment.

3D printed components can have downfacing surfaces, such as surfaces of holes or other features of the components. Due to the process of 3D printing, the component can have print-through of the downfacing surfaces. For example, as illustrated in FIG. 1, a component 100 can be generated that has a target (e.g., desired) geometry portion 104 and one or more print-through portions 108. The print-through portions 108 can correspond to material along one or more respective downfacing surfaces 112 that extend further than target dimensions or sizing of the target geometry portion 104 as indicated by a model used to generate the component 100.

Processes can be performed to compensate for the print-through portions 108 (e.g., Z compensation). For example, a thickness 116 of the component 100 can be measured in a vertical direction (e.g., Z thickness in the z direction in an x-y-z coordinate system). A target thickness, which can be indicated by the model used to generate the component 100, can be subtracted from the measured thickness 116 to determine a distance for Z compensation. For some 3D printers, a number of layers can be determined from the distance (e.g., by dividing the distance by a thickness of each layer), so that Z compensation can be applied based on the number of layers.

However, for various components, such as the component 100 described with reference to FIG. 1, the print-through may not be constant (e.g., the print-through can vary in the x or y directions relative to the downfacing surfaces from which the print-through occurs). For example, the print-through can vary by one or more layers depending on nearby features of the component. Printing components with features that have a size close to that of a printing resolution of the 3D printer can make such variations in print-through apparent.

Systems and methods as described herein can adaptively perform the Z compensation by applying different amounts of compensation at various portions of the component. As such, the print-through can more accurately be compensated for, such as to address situations in which the number of layers of the print-through is close to a resolution of the 3D printer. For example, the compensation can be performed based on an exposure corresponding to the down-facing surface (or feature adjacent to the downfacing surface, such as a hole), to enable the compensation to be adapted as a function of position. By determining how to perform the Z compensation using characteristics such as exposure, such systems and methods need not rely on measuring the component to determine the distance associated with the print-through (e.g., in order to proceed with one or more additional prints of the component), reducing time and material costs to accurately generate the component.

Figure 2:
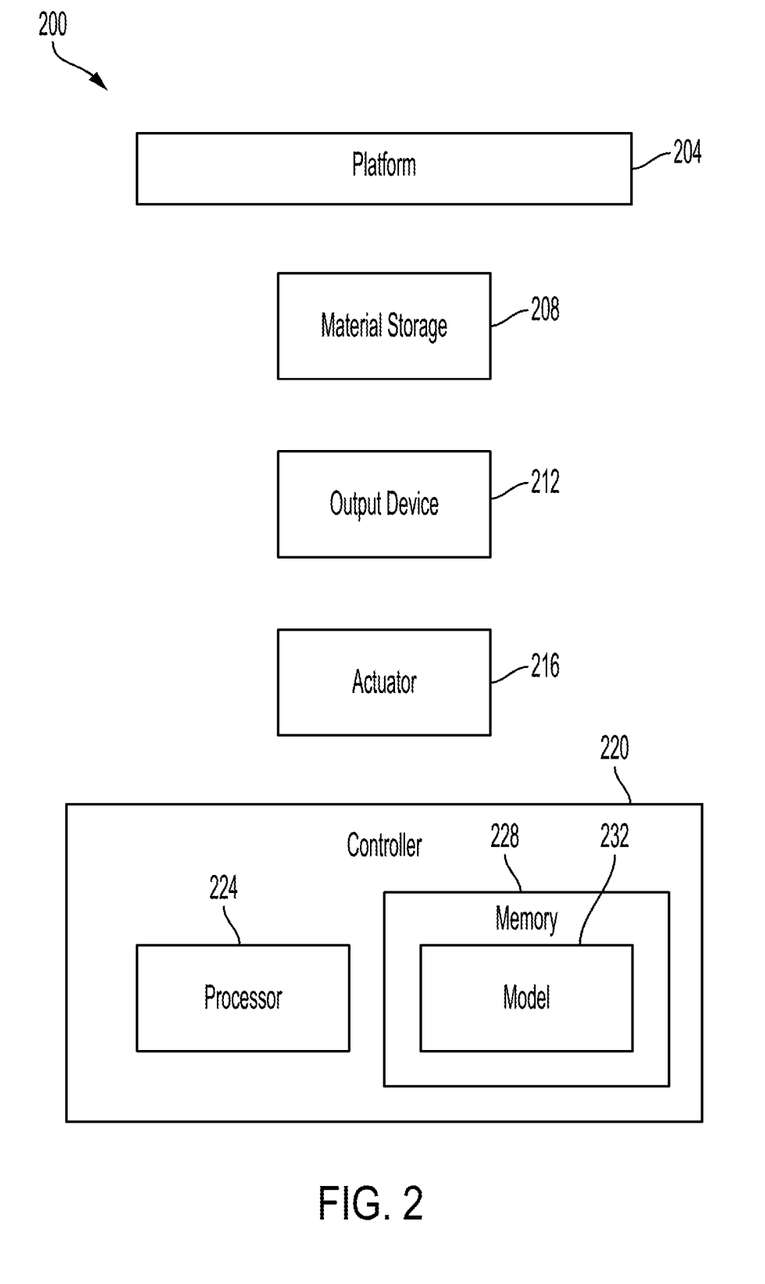
FIG. 2 illustrates a 3D printing system, according to an embodiment.

FIG. 2 illustrates a system 200. The system 200 can be used to generate a component by 3D printing and can perform adaptive Z compensation to reduce print-through of components generated by the 3D printer (e.g., reduce print-through as described with reference to FIG. 1). The system 200 can generate biological tissue components, such as artificial lung tissue or scaffolds corresponding to biological structures, such as the extracellular matrix portion of a lung. As described further herein, various features of the system 200 can be implemented using a digital light projection (DLP) system, such as an inverted DLP 3D printer or a Volumetric 3D printer. For example, various features of the system 200 can be implemented using the ProJet 1200 manufactured by 3D SYSTEMS. The system 200 can materialize a computer aided design (CAD) virtual 3D model by slicing the CAD model and photopolymerizing an object layer-by-layer. The system 200 can perform stereolithography (SL) techniques as a platform where the exposure of UV laser rasterizing takes place in a top-down manner. The system 200 can use DLP to eliminate laser rasterizing and can allow the photopolymerization of UV curable polymer to take place at a single exposure, in a bottom-up manner. Various features of the system 200 can be implemented using a 3D printing system 800 as described with reference to FIGS. 8 and 9.

The system 200 can include at least one platform 204. The platform 204 can provide a surface on which the component is to be formed. For example, the platform 204 can be a surface configured to be oriented parallel to ground during operation of the system 200.

The system 200 can include at least one material storage 208. The material storage 208 can store materials to be used for generating the component. For example, the material storage 208 can store inks or powders. The material storage 208 can store polymeric materials. The material storage 208 can store metallic materials. The material storage 208 can store photosensitive liquids. The material storage 208 can store resin materials. The material storage 208 can store materials of various densities, melting temperatures, indices of refraction, or other characteristics. The material (e.g., ink material) can have a penetration depth. The penetration depth can be greater than or equal to 10 μm and less than or equal to 500 μm. The penetration depth can be greater than or equal to 50 μm and less than or equal to 200 μm. The penetration depth can be 100 μm.

The system 200 can include at least one output device 212. The output device 212 can receive material from the material storage 208 (e.g., based on operation of one or more pumps through one or more tubes or pipes, not shown) and output the material to form the component. The output device 212 can include or be coupled with at least one actuator 216 that controls a position of the output device 212 responsive to a control signal. For example, the actuator 216 can control the position of the output device 212 in a coordinate system corresponding to a space around the platform 204, such as a Cartesian (e.g., x-y-z) coordinate system. The actuator 216 can include one or more motors or linear actuators to control the position of the output device 212 responsive to the control signal. The output device 212 can output materials in layers, which can have a layer size (e.g., layer height, layer thickness). For example, the layer size can be greater than or equal to 1 μm and less than or equal to 100 μm. The layer size can be greater than or equal to 5 μm and less than or equal to 50 μm. The layer size can be 20 μm. The layer size can be less than the penetration depth of the material.

The system 200 can include at least one controller 220. The controller 220 can include at least one processor 224 and memory 228. The processor 224 can be a general purpose or specific purpose processor, an application specific integrated circuit (ASIC), one or more field programmable gate arrays (FPGAs), a group of processing components, or other suitable processing components. The processor 224 can be configured to execute computer code or instructions stored in memory 228 (e.g., fuzzy logic, etc.) or received from other computer readable media (e.g., CDROM, network storage, a remote server, etc.) to perform one or more of the processes described herein. The memory 228 can include one or more data storage devices (e.g., memory units, memory devices, computer-readable storage media, etc.) configured to store data, computer code, executable instructions, or other forms of computer-readable information. The memory 228 can include random access memory (RAM), read-only memory (ROM), hard drive storage, temporary storage, non-volatile memory, flash memory, optical memory, or any other suitable memory for storing software objects and/or computer instructions. The memory 228 can include database components, object code components, script components, or any other type of information structure for supporting the various activities and information structures described in the present disclosure. The memory 228 can be communicably connected to the processor 224 via the controller 220 and may include computer code for executing (e.g., by processor 224) one or more of the processes described herein. The memory 228 can include various modules (e.g., circuits, engines) for completing processes described herein.

The controller 220 can control operation of the output device 212, such as by generating and transmitting a control signal to the output device 212 or the actuator 216 to cause operation of the output device 212 or the actuator 216. The controller 212 can generate the control signal to cause movement of the output device 212 to a target position. The controller 212 can cause material to be provided from the material storage 208 to the output device 212 (e.g., by operating one or more pumps).

The memory 228 can include at least one model 232. The model 232 can be maintained in a database of the memory 228. The model 232 or portions thereof can be received from a remote device, generated by an application executed by the controller 220, or generated by various combinations thereof.

The model 232 can represent the component to be generated using the system 200. The model 232 can represent a shape of the component and can have characteristics of the component assigned to positions (e.g., coordinates) in the shape of the component. The model 232 can have a coordinate system such that each element of the model is assigned a particular coordinate. For example, the model 232 can include a plurality of pixels corresponding to particular coordinates. The model 232 can have a Cartesian coordinate system, or various other coordinate systems (e.g., cylindrical, spherical). The coordinate system can be three-dimensional, such that each pixel corresponds to a volumetric element (e.g., voxel).

For example, the model 232 can include a data structure in which each data element of the data structure corresponds to a particular pixel and is assigned one or more characteristics of the component to be generated for the particular pixel. For example, each data element can be assigned a particular coordinate (e.g., x-y-z coordinate) and a material of the component to be used at the particular coordinate. One or more pixels of the model 232 may not be assigned a material (or can be assigned a flag or other indicator that no material is to be used), such that no material is to be provided for the portion of the component corresponding to the one or more pixels.

The controller 220 can cause the output device 212 to output the material to generate the component using the model 232. For example, the controller 220 can identify, from the data elements of the model 232, material to be outputted (or not outputted) at various positions corresponding to the pixels of the data elements. For example, for a particular pixel of the model 232, the controller 220 can cause the output device 212 to be moved to a location corresponding to the particular pixel and to output the material assigned to the particular pixel.

The controller 220 can be used to compensate for print-through of the component, such as by performing a Z compensation process. The controller 220 can identify, from the model 232, a pixel (e.g., at least one pixel) corresponding to a first surface of the component. The controller 220 can identify the at least one pixel by retrieving one or more adjacent pixels (e.g., second pixels within a threshold distance of the at least one pixel, such as within a threshold number of layers, such as less than three layers) and determining that no material is to be outputted for the one or more adjacent pixels. The first surface can be a down-facing surface. For example, the controller 220 can determine the first surface to be a down-facing surface based on the one or more adjacent pixels for which no material is to be outputted having a lesser z value in the x-y-z coordinate system used by the model 232 (or similarly determining that the adjacent pixels are lower than the at least one pixel in various coordinate systems). A number of the at least one pixel for which to perform Z compensation can correspond to the cumulative exposure described further herein (e.g., to perform Z compensation for each identified at least one pixel for which the cumulative exposure as determined from the model 232 does not satisfy the target exposure, and to not perform Z compensation for any pixel for which the cumulative exposure as determined from the model 232 (already) satisfies the target exposure).

The controller 220 can modify the model 232 to adjust an exposure corresponding to the at least one pixel. The controller 220 can modify the model 232 by removing material from being assigned to various pixels of the model, or by generating a new model (e.g., copy of the model 232) and modifying the new model. The controller 220 can modify the model 232 prior to causing the output device 212 to output material to generate the component (or prior to causing irradiation of the component), or during use of the output device 212, such as by evaluating one or more layers of the model 232 to determine if the one or more layers (or pixels adjacent to the one or more layers) are to have exposure adjusted as described herein.

The exposure can correspond to attenuation of light (e.g., based on the Beer-Lambert law), such as where the system 200 operates using DLP. For example, the attenuation of light can decay exponentially with respect to distance. The exposure can be proportional to a relationship based on the penetration depth and layer size as defined by Equation 1:

$$E_{tot,n} \propto \frac{\exp\left(-\frac{nh}{D_p}\right)}{\exp\left(\frac{h}{D_p}\right) - 1} \qquad \text{Equation 1}$$

where n is the amount of Z compensation performed (by modifying the model 232 to indicate that pixels below the at least one pixel are not to have material outputted), h is the layer size, and $D_p$ is the penetration depth. While the component may have various additional holes that can affect the exposure of the at least one pixel, at least some such holes may be at sufficient distance such that their effect is negligible (e.g., given the exponential decay of the functions of Equation 1).

Based on Equation 1, a change in exposure for the at least one pixel can be determined for a particular amount of Z compensation as compared to no Z compensation, as defined by Equation 2:

$$\frac{E_{tot,n}}{E_{tot,0}} = \exp\left(-\frac{nh}{D_p}\right) \qquad \text{Equation 2}$$

which can represent a cumulative exposure (e.g., total exposure) of the at least one pixel. For example, the cumulative exposure can correspond to exposure of the at least one pixel resulting from multiple layers of the component (e.g., multiple pixels or layers of pixels causing exposure for the at least one pixel). The cumulative exposure can be based on exposure from multiple pixels or layers of pixels for which an exposure (or effect on exposure) of the at least one pixel is greater than a minimum threshold. The cumulative exposure can be determined independently for each at least one pixel, such that adjacent pixels in the x-y plane are not affected by the Z compensation at a different x-y value.

The controller 220 can modify the model 232 based on a target exposure. For example, the target exposure can be proportional to the exposure with no Z compensation being performed (e.g., with n=zero), as determined using Equation 2. The target exposure can be greater than or equal to 0.1 and less than or equal to 0.5. The target exposure can be greater than or equal to 0.2 and less than or equal to 0.4. The target exposure can be 0.25. For example, the controller 220 can determine an exposure (e.g., cumulative exposure) of the at least one pixel (using Equation 2) for one or more candidate values of n (e.g., by iteratively evaluating Equation 2 using increasing values of n), compare the exposure to the target exposure, and select the value of n (e.g., number of layers for Z compensation) for which the exposure is less than or equal to the target exposure. The selected value can be a lowest value of n for which the exposure is less than or equal to the target exposure. The controller 220 can iteratively modify the model 232 by increasing a magnitude of Z compensation (e.g., number of layers of pixels for which to perform Z compensation; distance of pixels away from the at least one pixel for which to perform Z compensation) until the exposure is less than or equal to the target exposure. The controller 220 can perform Z compensation on a pixel-by-pixel basis, such as to apply Z compensation to a plurality of pixels until the exposure for a particular pixel is less than or equal to the target exposure.

The controller 220 can modify the model 232 using the selected value of n in order to generate the component with the corresponding removal of material (e.g., eroding of layers; non-output of material at the corresponding locations). For example, the controller 220 can identify the pixels of the model 232 corresponding to the layers of the selected value of n, and modify the identified pixels so that material is not assigned to be outputted for the identified pixels. As such, the controller 220 can adaptively perform Z compensation by determining the amount of Z compensation to be performed for any of the pixels of down-facing surfaces based on the exposure for those pixels.

Figure 3:
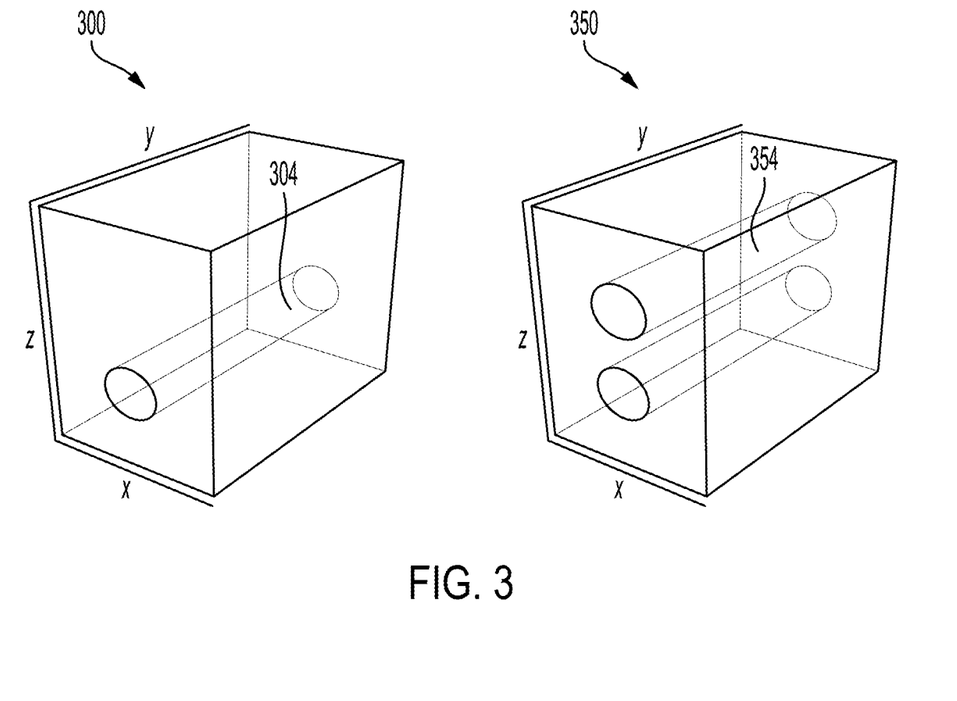
FIG. 3 illustrates components to be generated using a 3D printer, according to an embodiment.

FIG. 3 illustrates a component 300 and a component 350, in an x y z coordinate system, that can be generated using the system 200. The component 300 defines a first hole 304, and the component 350 defines two second holes 354. The holes 304, 354 can be susceptible to print-through of down-facing surfaces (e.g., surfaces that face downward during generation of the components 300, 350).

Figure 4:
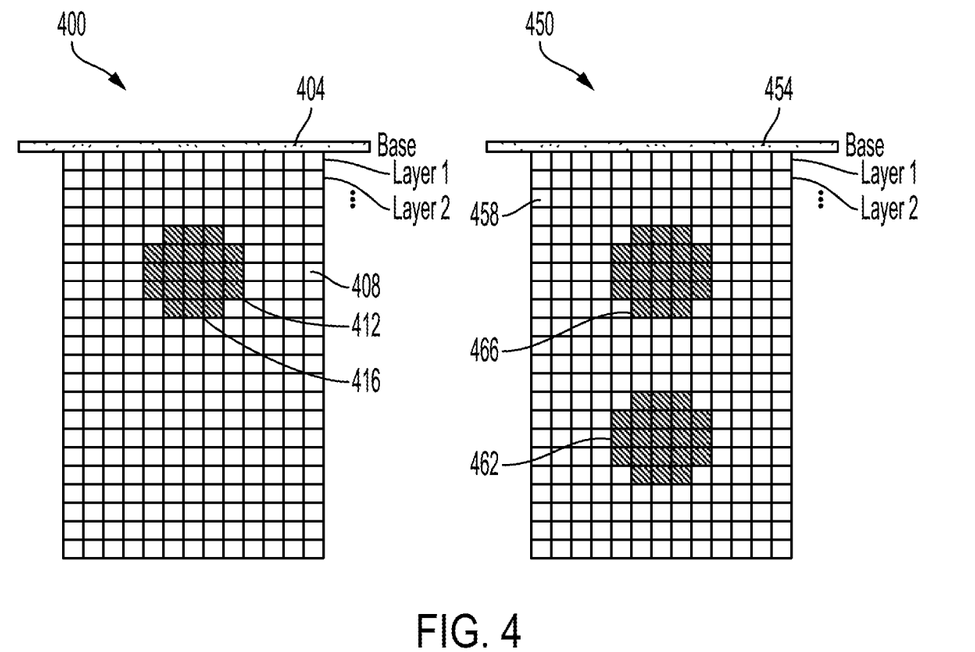
FIG. 4 illustrates vertical cross sections of pixel approximations of the components of FIG. 3, according to an embodiment.

FIG. 4 illustrates a diagram 400 of a cross-section of the component 300 and a diagram 450 of a cross-section of the component 350. The diagrams 400, 450 can correspond to models of the components 300, 350 (e.g., models 232 described with reference to FIG. 2). The diagram 400 depicts a base (e.g., platform) 404 and a plurality of layers 408 of the component 300 to be formed to generate the component 300, as well as a representation 412 depicting pixels corresponding to the first hole 304. The diagram 450 depicts a base 454 and a plurality of layers 458 of the component 350 to be formed to generate the component 350, as well as a representation 462 depicting pixels corresponding to the second holes 354. The diagram 400 includes a first pixel 416 of the component 300, which can correspond to a down-facing surface. The diagram 450 includes a second pixel 466 of the component 350, which can correspond to a down-facing surface.

Figure 5:
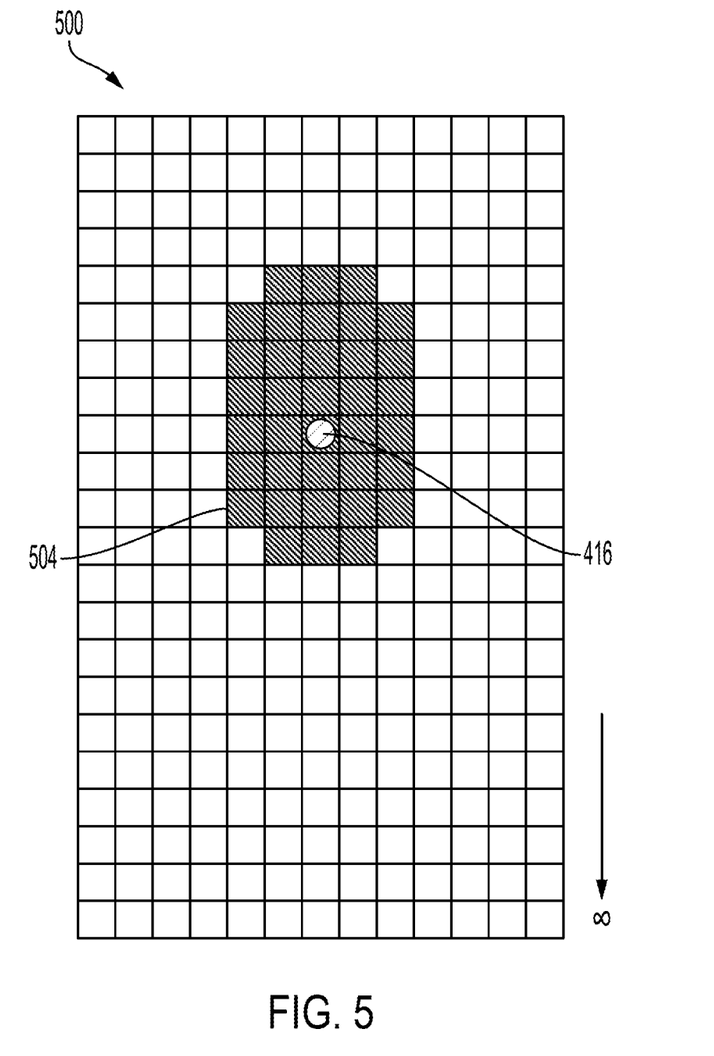
FIG. 5 illustrates various Z compensations applied to a model of a component of FIG. 3, according to an embodiment.

FIG. 5 illustrates a diagram 500 of the component 300 in which Z compensation is performed by assigning no material to a plurality of layers 504 (e.g., three layers 504 as depicted, i.e. n=3) adjacent to the first pixel 416 as compared to the diagram 400. Based on Equation 2 where n=3, h=20 μm, and $D_p$=100 μm, the total exposure for the first pixel 416 is about 0.251.

Figure 6:
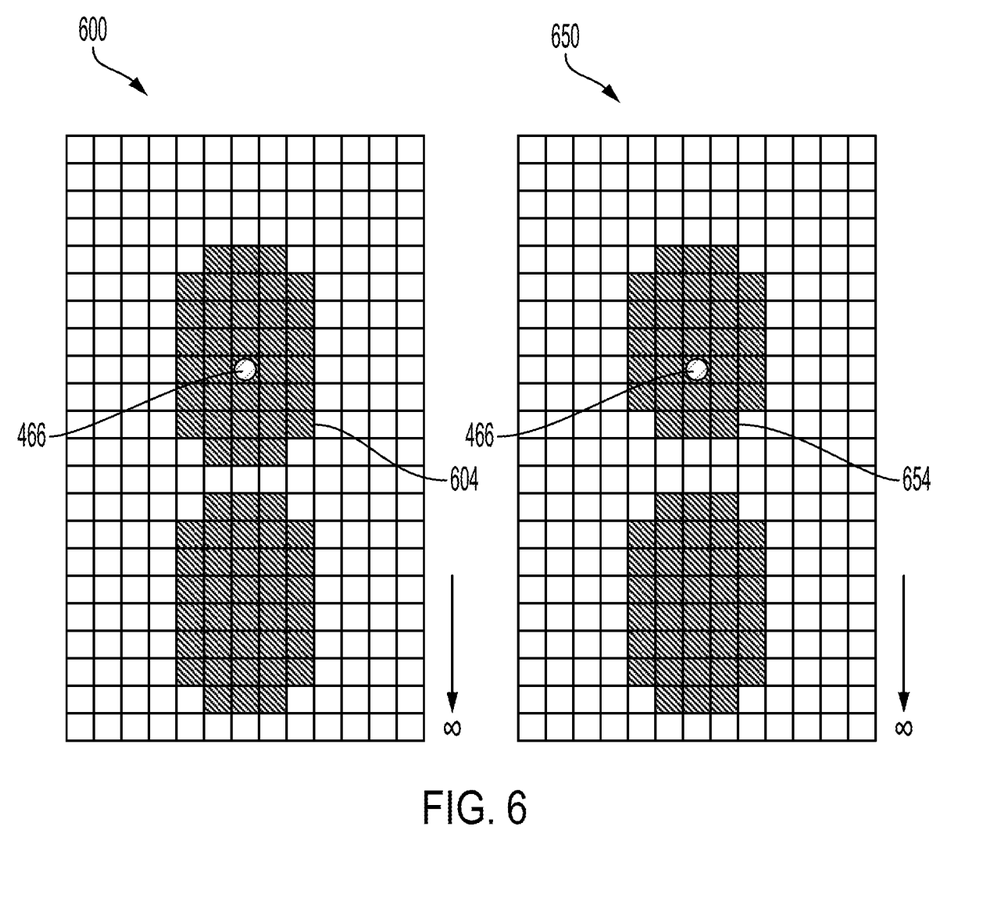
FIG. 6 illustrates Z compensation and adaptive Z compensation applied to a model of a component of FIG. 3, according to an embodiment.

FIG. 6 illustrates a diagram 600 of the component 350 in which Z compensation is performed by assigning no material to a plurality of layers 604 (e.g., three layers 604 as depicted, i.e. n=3) adjacent to the second pixel 466 as compared to the diagram 450. Based on Equation 2 where n=3, h=20 μm, and $D_p$=100 μm, the total exposure for the second pixel 466 is about 0.097, as the second hole 354 spaced from the second pixel 466 contributes to reducing the total exposure for the second pixel 466.

In an example where the target exposure is 0.25, the system 200 can adjust the number of layers 604 (e.g., by assigning or not assigning material to be outputted for particular pixels or layers of pixels in the model 232 of the component 350) to adjust the total exposure of the second pixel 466 to be less than the target exposure. For example, for the component 350, modifying the model so that n=0 results in total exposure of about 0.854, n=1 results in total exposure of about 0.476, and n=2 results in total exposure of 0.243, such that n=2 can be selected as the number of layers for Z compensation so that the total exposure is less than or equal to the target exposure.

For example, FIG. 6 depicts a diagram 650 of the component 350 in which Z compensation is adapted (e.g., further adapted) to adjust the total exposure of the second pixel 466 to be less than or equal to the target exposure by assigning no material to a plurality of layers 654 (e.g., two layers as depicted, i.e. n=2) adjacent to the second pixel 466, as compared to the diagrams 450, 600. As noted above, based on Equation 2 where n=2, h=20 20 μm, and $D_p$=100 μm, the total exposure for the second pixel 466 is about 0.243.

Figure 7:
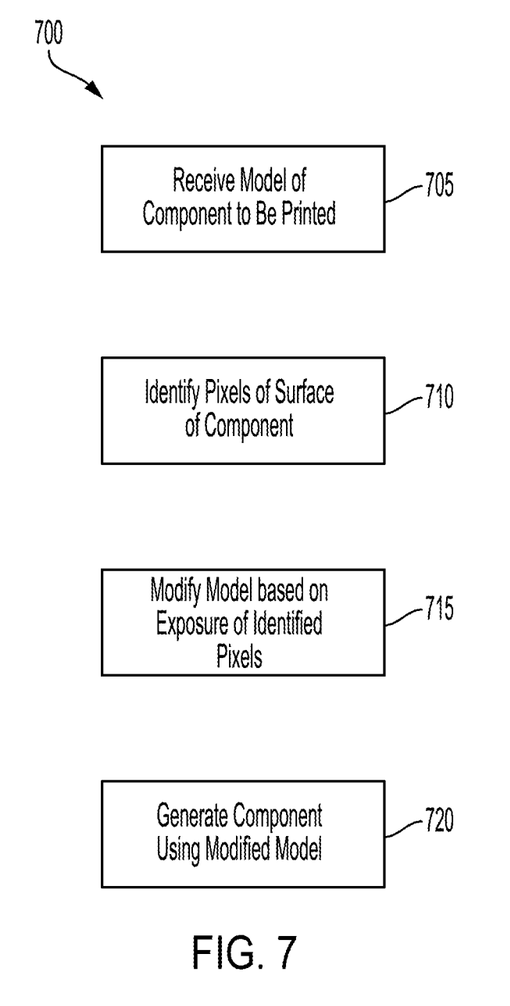
FIG. 7 illustrates a method for producing a component using 3D printing using z compensation, according to an embodiment.

FIG. 7 illustrates a method 700 for generating a component using adaptive compensation for 3D printing, including but not limited to components corresponding to biological tissue, such as artificial lung tissue. The method 700 can be performed using various systems and devices described herein, such as the system 200 and the 3D printing system 900. Various aspects of the method 700, such as modifying a model of a component to be generated by 3D printing can be performed prior to or during operation of 3D printing devices. Various aspects of the method 700 can be performed responsive to input from a user, or responsive to measuring features of a component to detect print-through.

At 705, a model of a component is received. The model can be a computational model in which the component is represented by a plurality of pixels. Each pixel can correspond to a spatial location in the component (e.g., position in a three-dimensional coordinate system). Each pixel can be assigned various characteristics of the component for the spatial location, such as a material to be outputted at the spatial location to form the component.

At 710, at least one pixel of the plurality of pixels corresponding to a first surface of the component is identified. The at least one pixel can be identified by determining that the at least one pixel is adjacent to a region of the model in which no material is assigned to one or more pixels of the region. For example, the first surface can be a surface of a hole of the component. The first surface can be a down-facing surface (e.g., the first surface can be above the region in an orientation of the model corresponding to how the material is to be outputted to form the component).

At 715, the model is modified. The model can be modified to compensate for print-through of material from the down-facing surfaces. For example, the model can be modified to adjust an exposure corresponding to the identified at least one pixel. The model can be modified by adjusting a magnitude of compensation (e.g., number of pixels or layers of pixels adjacent to the at least one pixel which are changed so that material is not outputted for the pixels or layers of pixels) based on a target exposure. The target exposure can be a maximum exposure threshold. The model can be modified until a total exposure (e.g., cumulative exposure) for the identified at least one pixel is less than or equal to the target exposure. The total exposure can be determined based on the at least one pixel (e.g., a first pixel) as well as at least one second pixel within a threshold distance of the first pixel, such as if another hole is located within the threshold distance from the first pixel.

At 720, an output device is controlled to generate the component based on the modified model. For example, the output device can skip over or otherwise avoid outputting material at the pixels or layers of pixels that were adjusted for the modified model in order to reduce the total exposure for the at least one pixel to be less than or equal to the target exposure.

Figure 8:
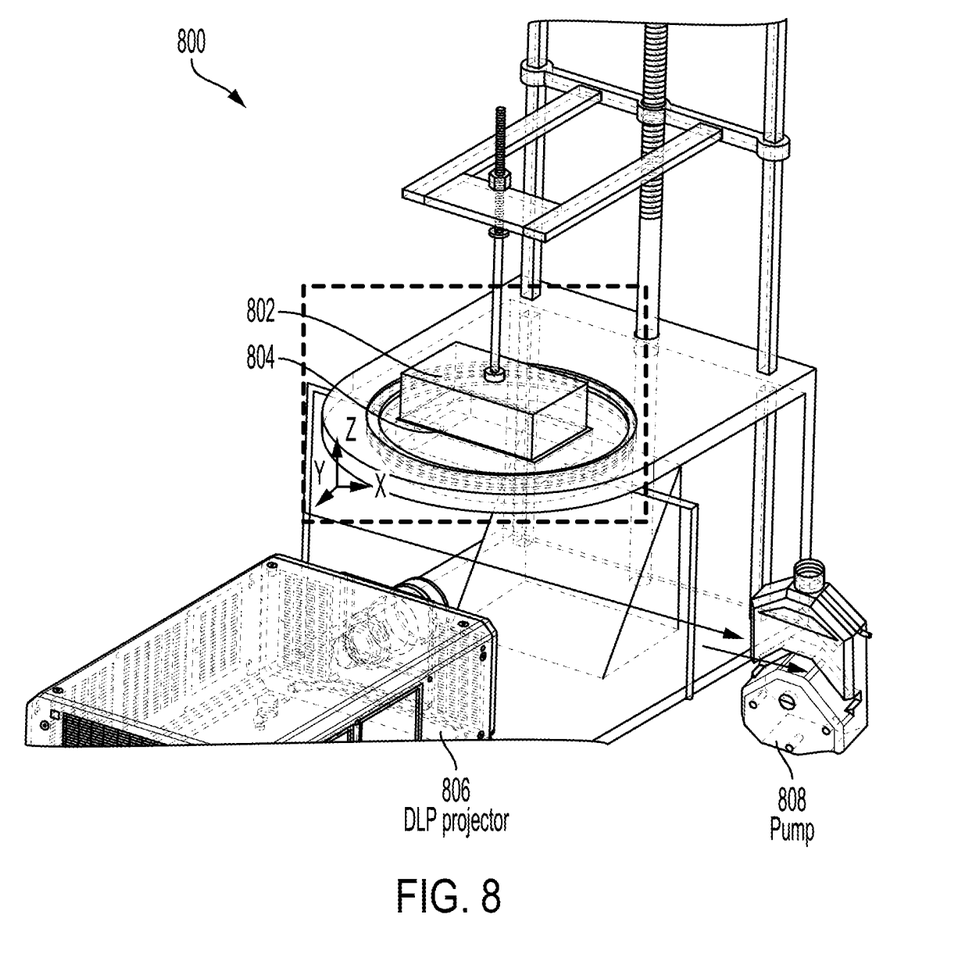
FIG. 8 illustrates a 3D printing system, according to an embodiment.
Figure 9:
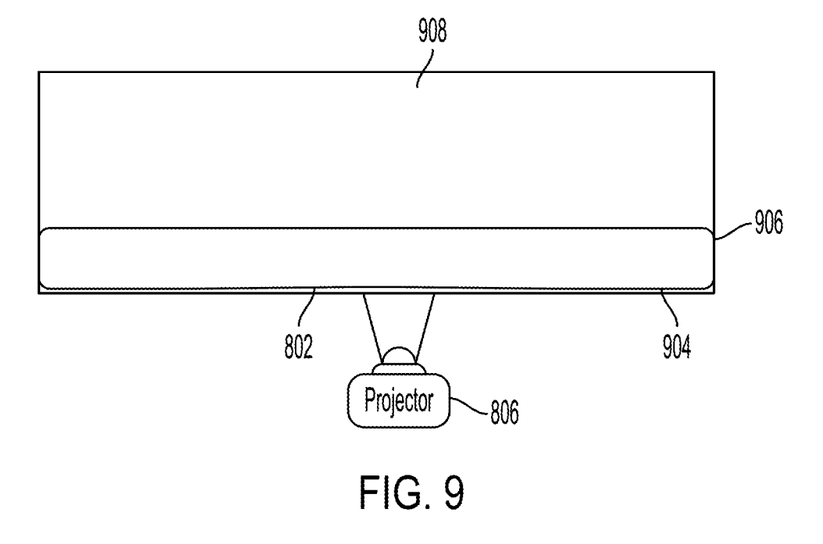
FIG. 9 illustrates a side view of the 3D printing system of FIG. 8, according to an embodiment.

FIGS. 8 and 9 illustrate a 3D printing system 800 that can be used to implement various systems and devices described herein, such as the system 200. The 3D printing system can include a platform 802 (e.g., print platform) on which a component, such as a three-dimensional object, is formed. The component can include an artificial organ (e.g., artificial lung, artificial heart, artificial kidney, artificial liver). The 3D printing system 800 can include an oxygen soluble liquid 804 (e.g., oxygen carrier liquid) having a build surface.

The build surface and the platform 802 can define a build region 804 (e.g., build window) therebetween. The 3D printing system 800 can include a controller configured to advance the platform 802 away from the build surface. For example, the controller can lower or raise the platform 802. The controller can be configured to maintain an oxygen inhibition layer thickness of at least 20 μm. For example, the controller can maintain an oxygen inhibition layer thickness of 20 μm, 25 μm, 30 μm, 35 μm, 40 μm, 45 μm, or 50 μm.

The system 800 can include a radiation source 806 (e.g., DLP projector, projector, illumination source, etc.) configured to irradiate the build region 804. The radiation source 806 can be configured to irradiate the build region 804 through an optically transparent member and the oxygen soluble liquid 804 to form a solid polymer from a photosensitive liquid (e.g., photosensitive resin, ink, etc.). The 3D printing system 800 can include at least one pump 808, such as a peristaltic pump, to recirculate the oxygen soluble liquid 804. The pump 808 can include a positive displacement pump used to pump the oxygen soluble liquid 804.

As depicted in FIG. 9, the platform 502 can include a transparent glass 902 (e.g., optically transparent glass, optically transparent member). For example, the transparent glass 902 can support the oxygen soluble liquid 804. The oxygen soluble liquid 804 can be disposed on the transparent glass 902. The thickness of the transparent glass 902 can be substantially less than the thickness of the oxygen soluble liquid 804.

The platform 802 can include a high density oxygen carrier liquid (e.g., non-compressible oxygen carrier liquid) on the transparent glass 802. The platform 802 can include an ink 908 (e.g., photosensitive ink, photosensitive liquid). The photosensitive liquid can be disposed on the oxygen soluble liquid 804. The oxygen soluble liquid 804 can be located below the ink 908. The density of the oxygen soluble liquid 804 can be greater than a density of the photosensitive liquid. The platform 802 can include an interface 906 between oxygen carrier liquid and photosensitive ink (e.g., an ink and PFD interface). The thickness of the ink 908 can be greater than the thickness of the oxygen soluble liquid 604. The thickness of the ink 908 can be substantially greater than the thickness of the transparent glass 902.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. When referring to a first numerical value as "substantially" or "about" the same as a second numerical value, the terms can refer to the first numerical value being within a range of variation of less than or equal to ±10% of the second numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Elements other than 'A' and 'B' can also be included.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

The systems and methods described herein may be embodied in other specific forms without departing from the characteristics thereof. The foregoing implementations are illustrative rather than limiting of the described systems and methods.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. An additive manufacturing device, comprising:
   an output device configured to receive at least one material to generate a component; and
   a controller comprising one or more processors configured to:
   receive a model comprising a plurality of pixels representing the component;
   identify at least one pixel of the plurality of pixels corresponding to a first surface of the component;
   modify the model to adjust an exposure corresponding to the at least one pixel based on a target exposure by selecting an amount of Z compensation for the at least one pixel such that the exposure is less than or equal to the target exposure; and
   control operation of the output device to cause the output device to generate the component based on the modified model.

2. The additive manufacturing device of claim 1, wherein the controller is configured to modify the model by performing the amount of Z-compensation to adjust the exposure.

3. The additive manufacturing device of claim 1, wherein the at least one pixel includes a first pixel, and the controller is configured to determine the exposure as a cumulative exposure based on a plurality of second pixels of the plurality of pixels, the plurality of second pixels arranged in a plurality of layers relative to the first pixel.

4. The additive manufacturing device of claim 1, wherein the at least one pixel is at least one first pixel, and the controller is configured to determine the exposure based on at least one second pixel within a threshold distance from the at least one first pixel.

5. The additive manufacturing device of claim 1, wherein the controller is configured to adjust the exposure to cause the exposure to be less than or equal to the target exposure.

6. The additive manufacturing device of claim 1, wherein the controller is configured to iteratively modify the model by increasing a magnitude of the amount of Z-compensation until the exposure is less than or equal to the target exposure.

7. The additive manufacturing device of claim 1, wherein the first surface is a downward-facing surface.

8. The additive manufacturing device of claim 1, wherein the output device is configured to generate the component as a biological tissue component using a resin as the material.

9. The additive manufacturing device of claim 1, wherein the plurality of pixels comprise a plurality of volumetric elements (voxels) in a three-dimensional coordinate space.

10. The additive manufacturing device of claim 1, wherein the at least one pixel includes a first pixel, and the controller is configured to apply Z compensation to a plurality of second pixels of the plurality of pixels until the exposure for the first pixel is less than or equal to the target exposure.

11. A system, comprising:
    one or more processors configured to:
    receive a model comprising a plurality of pixels representing a component;
    identify at least one pixel of the plurality of pixels corresponding to a first surface of the component;
    modify the model to adjust an exposure corresponding to the at least one pixel based on a target exposure by selecting an amount of Z compensation to perform on the at least one pixel such that the exposure is less than or equal to the target exposure; and
    control operation of an output device to generate the component based on the modified model.

12. The system of claim 11, wherein the one or more processors are configured to modify the model by performing the amount of Z-compensation to adjust the exposure.

13. The system of claim 11, wherein the one or more processors are configured to cause the output device to generate the component using a resin.

14. The system of claim 11, wherein the one or more processors are configured to cause the output device to generate the component as a biological tissue component.

15. A method, comprising:
    receiving, by one or more processors, a model comprising a plurality of pixels representing a component;
    identifying, by the one or more processors, at least one pixel of the plurality of pixels corresponding to a first surface of the component;
    modifying, by the one or more processors, the model to adjust an exposure corresponding to the at least one pixel based on a target exposure by selecting an amount of Z compensation to apply to the at least one pixel such that the exposure is less than or equal to the target exposure; and
    controlling, by the one or more processors, an output device to generate the component based on the modified model.

16. The method of claim 15, wherein modifying the model comprises performing the amount of Z-compensation to adjust the exposure.

17. The method of claim 15, wherein the at least one pixel is at least one first pixel, the method further comprising determining, by the one or more processors, the exposure based on at least one second pixel within a threshold distance from the at least one first pixel.

18. The method of claim 15, further comprising adjusting, by the one or more processors, the exposure to cause the exposure to be less than or equal to the target exposure.

19. The additive manufacturing device of claim 1, wherein the target exposure is greater than or equal to 0.1 and less than or equal to 0.5.

20. The additive manufacturing device of claim 1, wherein the target exposure comprises a threshold for exposure of the at least one pixel.

\* \* \* \* \*